Jan. 29, 1957  J. T. MATTHEWS  2,779,642
SWIVEL
Filed June 14, 1954  3 Sheets-Sheet 1
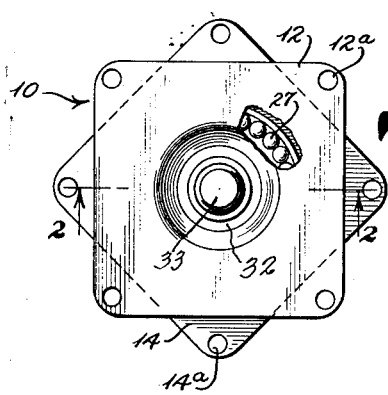
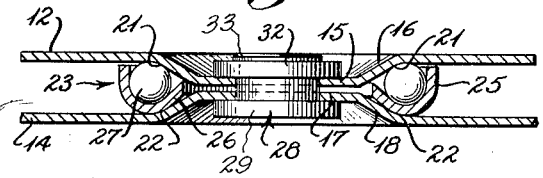
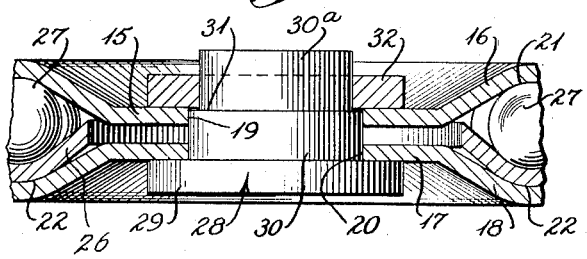
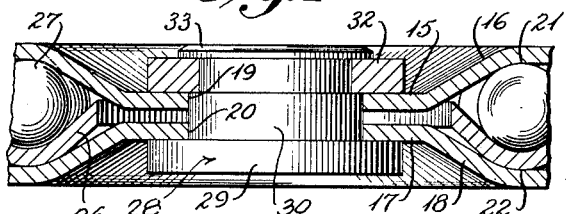
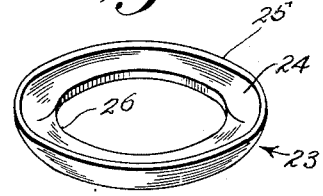
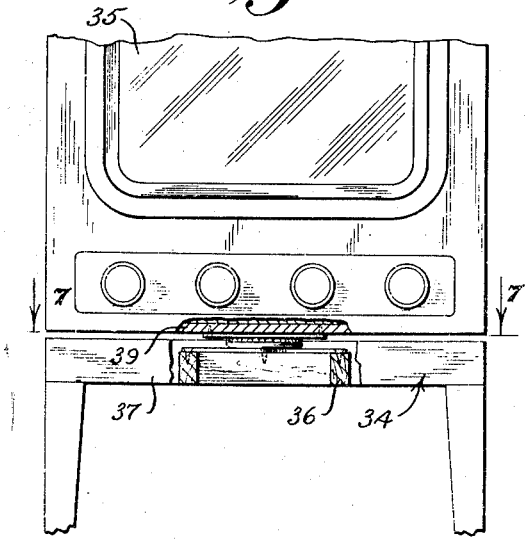
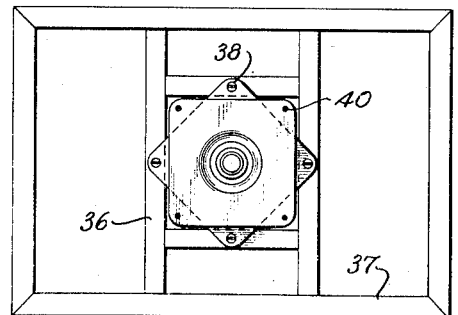
INVENTOR
John T. Matthews
BY Shoemaker & Mattare
ATTORNEYS

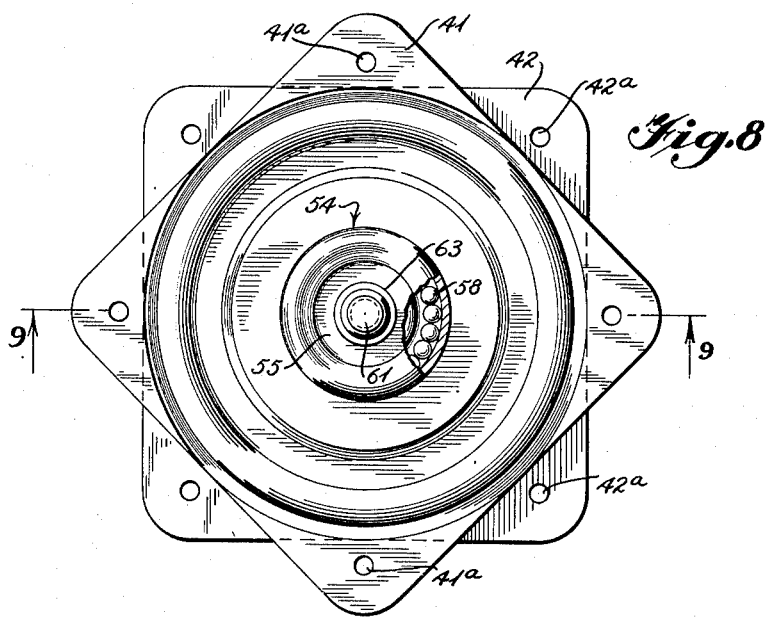
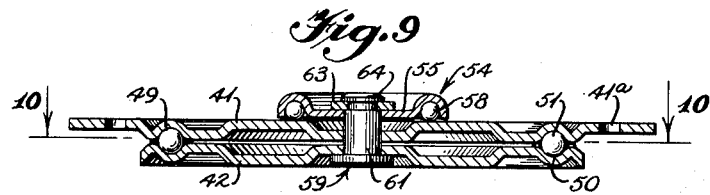
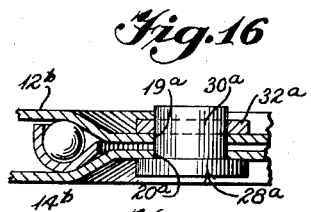
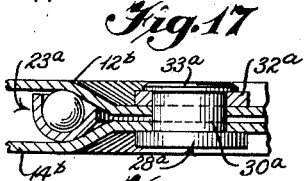
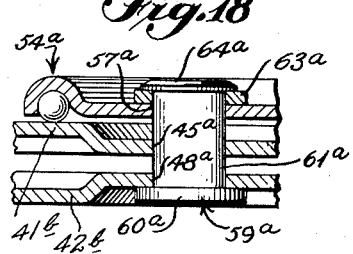
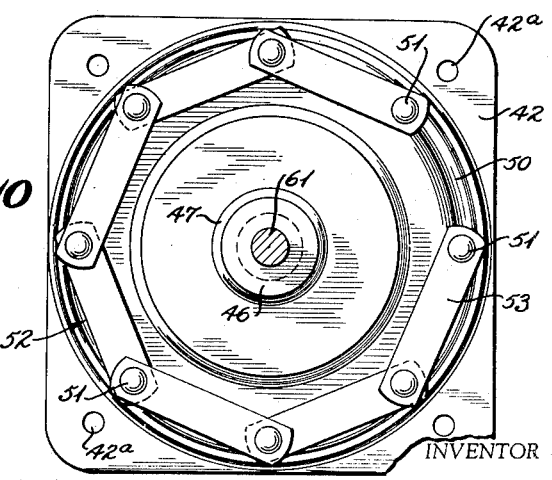
INVENTOR
John T. Matthews
BY Shoemaker + Mattare
ATTORNEYS Jan. 29, 1957 J. T. MATTHEWS 2,779,642
SWIVEL
Filed June 14, 1954 3 Sheets-Sheet 3
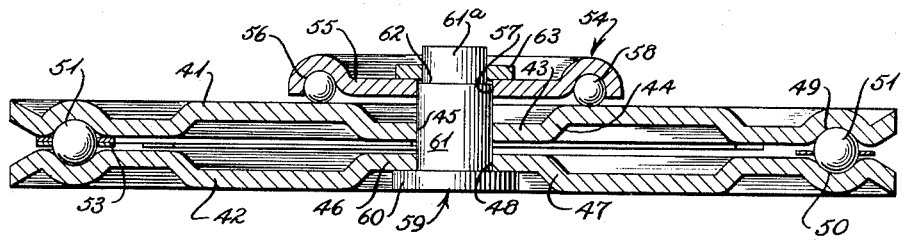
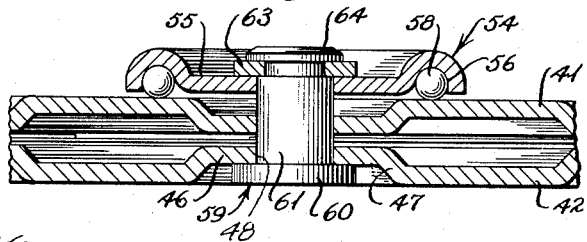
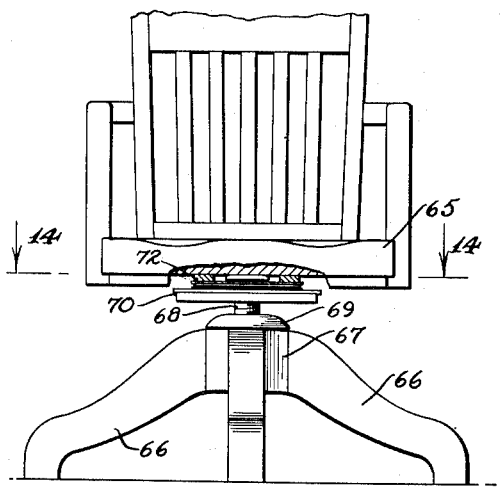
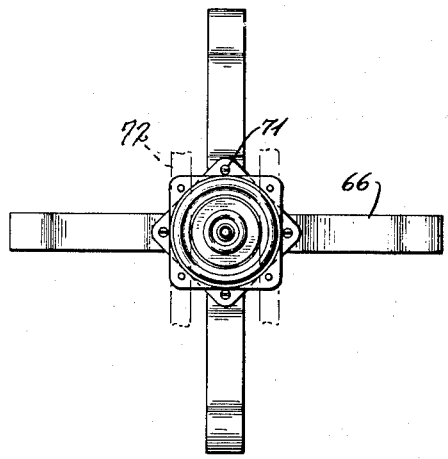
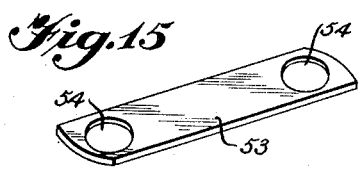
INVENTOR
John T. Matthews
BY Shoemaker & Mattare
ATTORNEYS United States Patent Office 2,779,642
Patented Jan. 29, 1957

2,779,642

SWIVEL

John T. Matthews, Charlotte, N. C., assignor to Wil-Mat Corporation, Charlotte, N. C., a corporation of North Carolina Application June 14, 1954, Serial No. 436,314

5 Claims. (Cl. 308—227)

This invention relates generally to improvements in swivels and is directed particularly to swivels designed for rotatably supporting one body upon another.

Various articles of furniture such as chair seats, tables and the like, and other structures, are commonly mounted for rotary or turning movement but the mounting or swivel means of known construction for this purpose are unsatisfactory in action in various respects. For example, swivel mounts for chairs are without exception constructed in such a manner that the chair seat, when unoccupied turns freely so that when a person occupying the chair rises therefrom, if he makes a turning movement at the same time, the chair seat will continue to turn so that when the person wishes to be reseated, he must first turn the chair seat back to a suitable position.

Also, in the employment of known types of swivel mountings where such may be used for supporting other articles of furniture such as radio cabinets or the like or rotatable book shelves or cases, the supporting swivels are so loosely assembled or formed that when manual rotation is imparted to the structure it will continue to turn after the pressure has been removed so that it frequently becomes necessary for the person moving the structure to check the rotation in order to stop the structure in the desired position.

It is an object of the present invention, in the light of the foregoing, to provide a new and novel type of swivel structure which will turn freely upon the application of relatively light force to the body supported by the swivel but will cease turning or rotating as soon as such force is removed so that the supported object will not swing or turn beyond a desired position after such position has been attained by the application of force or pressure to the body.

While the present invention in one embodiment may be used in association with chairs or seats of any character, such as office chairs or the like, it is particularly well suited for use as a television chair or seat support because of the fact that it will not only permit the occupant of the seat to turn freely from one position to another, but will check the turning of the seat if the occupant should rise therefrom so that reseating can be accomplished without difficulty. This is especially important in a chair of this kind where the same is commonly used in a dimly lighted room and therefore it is unnecessary for the occupant to feel around or fumble for the seat to get it in the right position for reseating after rising therefrom.

The invention in another embodiment, while it may be readily used for supporting a type of heavy structure, is particularly well adapted for supporting a television table or a television unit directly upon a table since its design and construction are such that it will permit a smooth easy turning of the unit to a desired position but will stop turning or rotating as soon as pressure is removed so that the unit will not swing beyond the desired position.

In known types of swivels designed particularly for application to chairs, a problem exists resulting from the application of leverage pressure which tends to force the bearing balls out of their normal race and causes a binding of the swivel. It is, accordingly, a further object of the invention to provide a new and novel swivel structure wherein the construction and relation of the parts is such that such binding will not occur regardless of the location in which leverage pressure is applied to the chair structure.

Another objectionable feature found in known types of swivels is the impossibility of controlling and removing all of the slop or looseness from the assembly. It is, accordingly, another object of the present invention to provide a new and novel swivel construction wherein all the tolerance in the assembly is removed to make a tight fitting, yet freely turning assembly whereby a much more substantial or stable chair or table construction is obtained.

Still another object of the invention is to provide a new and novel swivel construction wherein noise and vibration are eliminated from the operation thereof.

The foregoing and other objects are attained by the provision of a pair of mounting or attaching plates coupled together by a central stud which passes through the same, in association with a new and novel type of ball race encircling the stud. Means at one end of the stud is located at a calculated distance from a head, or other means, at the other end thereof to maintain parts lying between the head and said means pressed together in a snug or tight relation which will be sufficient to restrain the mounting or attaching plates against rotating freely relative to one another but will permit smooth and free rotation under lightly applied force or when weight is applied on the swivel. The ball bearing separated parts are thus firmly held together to control the amount of slop or looseness in the assembly by controlling the distance between the means on the stud and the head.

One such means by which the objects of the present invention are attained comprises a shoulder formed around the stud adjacent to the end remote from the head with which cooperates a collar which is forced into a binding relation with the plates by swaging the adjacent end of the head down thereagainst. Said shoulder may be formed in the material of the stud or may be provided by the employment of a sleeve of desired or predetermined length encircling the stud and engaging at one end against the head thereof.

Another means contemplated for use to accomplish the desired holding together of the plates to restrain the same against free spinning movement comprises the employment of a collar on the stud and the swaging over of the end of the stud against the collar under a predetermined pressure whereby the flange formed by such swaging action is pressed against the collar and the collar is in turn caused to bear with a predetermined pressure against the underlying plate. In place of the collar, the flange formed by the swaging action may be caused to bear directly against the plate member through which the stud extends.

In addition, the attainment of the objective to reduce the noise and vibration in the swivel structure is by locating the ball race in close proximity to the center of the unit to locate the bearing balls closely around the hub of the unit rather than around the edge or outer portion of the assembly.

The invention will be best understood from a consideration of the following detailed description taken in connection with the accompanying drawings forming a part of the specification, with the understanding that the invention is not confined to a strict conformity with the showing of the drawings but may be changed or modified within the scope of the appended claims.

Fig. 1 is a view in top plan of a swivel constructed in accordance with one embodiment of the present invention showing one of the plates rotated out of matching relation with the other plate and showing the top plate broken away to disclose a portion of the ball race and balls therebeneath.

Fig. 2 is a transverse section taken substantially on the line 2—2 of Fig. 1 and on an enlarged scale, showing the completion of the assembly at the center thereof.

Fig. 3 is a sectional view corresponding to Fig. 2, but on a larger scale, illustrating the relation of the parts prior to the swaging or upsetting of the end of the stud for securing the parts in their permanently assembled relation.

Fig. 4 is a sectional view corresponding to Fig. 3 and illustrating the final relation of the parts after swaging the end of the stud.

Fig. 5 is a view in perspective of the annular bearing cup or raceway body shown in Figs. 1 to 4.

Fig. 6 is a view in elevation of a table or stand showing the use in connection therewith of the embodiment of the swivel as illustrated in Figs. 1 to 4 for the support thereon of a cabinet such as a television or the like, portions of the cabinet and table structure being broken away.

Fig. 7 is a horizontal section taken substantially on the line 7—7 of Fig. 6.

Fig. 8 is a view in top plan of another embodiment of the swivel structure wherein the top plate is turned to a position out of matching relation with the underlying plate and is broken away to show details of the inner or central race unit.

Fig. 9 is a transverse sectional view taken substantially on the line 9—9 of Fig. 8.

Fig. 10 is a horizontal section taken substantially on the line 10—10 of Fig. 9.

Fig. 11 is a transverse section on an enlarged scale of the unit shown in Fig. 8 illustrating the relation of the parts prior to the swaging or upsetting of the end of the stud to permanently secure the parts together.

Fig. 12 is a sectional view of the central portion of the second embodiment of the invention corresponding to the section for Fig. 11 but showing the relation of the parts after the swaging of the end of the securing stud.

Fig. 13 is a view illustrating in elevation the lower portion of a conventional type of pivoted or swivel chair illustrating the application of the swivel unit in the second embodiment thereof.

Fig. 14 is a horizontal section taken substantially on the line 14—14 of Fig. 13.

Fig. 15 is a view in perspective of one of the link elements forming a part of the bearing ball cage.

Fig. 16 is a detail section illustrating the use of a straight or unshouldered pivot stud for pivotally coupling the plates together, the stud being shown in its original form prior to swaging the end thereof.

Fig. 17 is a view corresponding to Fig. 16 but showing the manner of securing the plates together by swaging the end of the straight unshouldered stud against the binding collar.

Fig. 18 is a view illustrating the method of securing together the elements of the second embodiment of the invention by swaging a straight unshouldered stud against the binding collar.

Referring now more particularly to the drawings, the description of the invention will first be directed to the embodiment thereof illustrated in Figs. 1 to 7 inclusive, which embodiment is designed primarily for the support of a cabinet or similar structure, such as a television cabinet, upon a suitable table structure. It is to be understood, however, that while reference is made to the use of this embodiment of the invention for supporting a television set or other cabinet structure, there is no intention to limit the use of the device in any particular.

The swivel structure is generally designated 10 and, as shown, comprises the two attaching or mounting plates 12 and 14 which are here illustrated as being of square outline and of the same size or dimensions. While the plates 12 and 14 have been illustrated as of square configuration, it will be readily apparent that they may be of any other geometrical form desired, as may be required to facilitate their attachment to a supporting structure and the body to be rotatably mounted thereon.

While either the plate 12 or the plate 14 may be uppermost when the swivel device is placed in operative position, for ease of description the plate 12 will be referred to as the top plate and the plate 14 as the bottom plate as they are illustrated in the several views.

The plates 12 and 14 are of duplicate form as shown and each has a central depressed area which areas are placed, in the assembly of the swivel, with the projected sides in opposed relation.

As illustrated, the depressed central portion of the top plate 12 has a central flat circular area 15 joined to the surrounding body of the plate by the sloping or inclined wall 16 and, in the bottom plate 14, the flat central portion or area is designated 17 and the sloping wall connecting it with the surrounding body portion of the plate is designated 18.

The central portions 15 and 17 of the plates are provided respectively with the centrally located openings 19 and 20. These depressed portions are of the same diameter in the two plates so that, as previously stated, the plates are exactly duplicates of one another and either plate can function as the top plate and the other as the bottom plate, as stated.

Where the inclined portion 16 or 18 of the respective plates joins the part of the plate lying outwardly therefrom the corner 21 or 22 thus formed, functions in the manner hereinafter set forth as a bearing ball groove or raceway.

The numeral 23 generally designates a ball bearing cup having an annular race channel 24 and designed to rest upon the inclined wall portion 18 of the bottom plate in concentric relation with the opening 20 and with the opening 19 of the upper plate as illustrated. This annular race channel 24 of approximately quarter-circular cross sectional form as illustrated, which channel on the outer side is defined by a short substantially straight upstanding flange 25 and, on the inner side, merges with the short straight upwardly and inwardly sloping base or bottom flange 26.

The inwardly extending or bottom flange 26 of the cup race is disposed at an inward and upward angle slightly sharper than the angle of the portion 18 so that it lies through a part of its length against the surface of the portion 18 and is slightly spaced therefrom adjacent to its free edge as illustrated. The diameter of the cup race 23 is such that the bearing balls which completely fill it and are in contacting relation, as shown in Fig. 1, are spaced around and relatively close to the opening 19 and 20 and to the hereinafter described pivot stud which secures the top and bottom plates together.

The plates 12 and 14 are coupled and secured together in operative relation by a stud which is generally designated 28.

This stud comprises in its initial form, that is, before it is affixed in position to secure the plates together, the head 29 and the body portion 30 extending centrally therefrom, and this body portion is reduced intermediate its ends to form the terminal or end portion of smaller diameter which is designated 30a and the shoulder 31 at the inner end thereof.

The length of the rivet stud from the head 29 to the shoulder 31 is carefully calculated so that when the bearing unit is placed in position between the plates 12 and 14 and the stud is extended through the aligned openings 19 and 20 as shown in Fig. 3 with the head 29 against the outer side of the central portion 17, the outer side or face of the central portion 15 of the top plate, will lie slightly above the surface of the shoulder 31.

A washer 32 is next placed on the reduced end portion 30a of the stud to rest against the outer side of the portion 15 over the shoulder 31 as illustrated, and the projecting end of the stud is then swaged over or turned down as indicated at 33 sufficiently to force the washer 32 down against the shoulder 31, which operation will increase the compression of the opposing plates 12 and 14 against the bearing unit. By the proper regulation of the length of the shoulder portion of the rivet stud with respect to the spacing between the parts 15 and 17 of the plates by the interposed bearing unit the parts of the assembly will be drawn together with the desired degree of tightness to retain the top and bottom plates against free rotation or, in other words, prevent the top plate from being freely spun around the rivet stud with respect to the bottom plate. However, when weight is applied to the top plate 12 while the bottom plate is resting upon a suitable support, the frictional engagement between the parts is decreased slightly so that the top plate and the body carried thereon can be easily turned by hand but, when the hand force is removed, rotation of the supported body and the top plate 12 will cease immediately so that the body will not swing beyond the desired position.

In order to facilitate the securing of the plates 12 and 14 to the structures between which the swivel is to be mounted, each of the plates is provided with suitable screw or bolt openings as, for example, the top plate 12 has an opening 12a adjacent to each of its corners and the bottom plate 14 has an opening 14a adjacent to each of its corners.

One manner of using the swivel is illustrated in Fig. 6 wherein there is shown a stand which is generally designated 34 and a cabinet such as a television cabinet which is generally designated 35 mounted on the stand with the supporting swivel between. In this illustration, the stand or table is shown as having a suitable framework 36 between the front and rear sides 37 on which is secured, by screws 38, the bottom plate 14 and the cabinet 35 of the television set is shown as having the top plate 12 secured to its bottom, which is designated 39, by the screws 40.

It will be seen that by making the plates in the form illustrated, after the bottom plate has been secured to the stand frame 36 the top plate can be secured by screws or the like to the bottom of the cabinet 35 by turning the top plate sufficiently to bring the openings in the corners thereof beyond the sides of the bottom plate as shown in Figs. 1 and 7 so that the securing screws can be readily passed through the openings in the top plate into the overlying structure.

While the swivel has been illustrated in Fig. 6 as having the top plate 12 secured directly to the bottom of the cabinet 35, it is to be understood that, if preferred, such top plate may be secured to a table top and the cabinet 35 then placed upon such top to turn therewith, either being maintained in position by its weight alone, or the table top may be suitably flanged or otherwise formed to keep the cabinet in position thereon.

Figs. 8 to 12 illustrate the second embodiment of the invention, the application of which is illustrated in Figs. 13 and 14.

This embodiment comprises the two plates 41 and 42 which correspond respectively to plates 12 and 14 and which will be referred to as the top and bottom plates respectively although, as stated in connection with the first embodiment, either plate may be the top and bottom plate, and these plates are illustrated as being of square design but may be made of any other desired configuration.

In the square form shown, each of the plates has a corner opening for the passage therethrough of a securing element, as, for example, plate 41 has the corner openings 41a, and the bottom plate 42 has the corner openings 42a.

Each of the plates 41 and 42 is pressed to provide a central depression producing in the top plate 41 the central circular flat portion 43 which is joined to the surrounding body of the plate by the inclined wall 44. The portion 43 has the central opening 45 therethrough for the reception of the hereinafter described rivet stud.

The plate 42 has a corresponding central circular portion 46 connected with the surrounding body of the plate by the inclined portion 47 and the central portion 46 has the center opening 48 therethrough which is of the same diameter as the opening 45.

Concentric with the opening 45, the top plate 41 is formed by pressing, or other suitable means, with the bearing race or channel 49 and the bottom plate is formed with a corresponding bearing race or channel 50 of the same diameter as the race 49 and concentric with the opening 48, and these races or channels open inwardly or in the direction in which the impressed central portions of the plates project so that when the plates are assembled with the projecting sides of the central portions 43 and 46 in opposed relation, the channels will be in cooperating relation to form the complete raceways for a plurality of bearing balls 51.

As illustrated in Fig. 10, a cage structure is provided for maintaining the balls 51 in a predetermined spaced relation in the raceway channels 49 and 50. This cage is generally designated 52 and it comprises a plurality of thin metal strips 53 each of which is provided at each end with an aperture 54 which is of the proper diameter to receive the bearing ball with sufficient snugness to prevent looseness but to permit the ball to turn freely. These spacing strips are arranged, as shown in Fig. 10, in end overlapping relation and each pair of cooperating ends encircles the bearing ball 51 and these strips are relatively thin so that the total thickness of the overlapping ends will not be greater than the space between the plates 41 and 42 in the assembled swivel, as is clearly illustrated in Figs. 9 and 11.

As illustrated in Fig. 10, two adjacent balls 51 are maintained in position by an end of one strip only as it will be readily apparent that the employment of a second strip between these balls is unnecessary.

As is clearly illustrated in Fig. 8, the ball race channels 49 and 50 for the two plates are made of the maximum diameter permitted by the width of the plates so that in the assembled swivel structure there will be no relative movement other than rotational, between the plates.

Disposed against the outer side of one of the plates, here shown as the plate 41, is a bearing assembly which is generally designated 54. This assembly comprises a circular plate 55 which is formed by pressing or otherwise, to have an annular cup or raceway 56 and a central aperture 57 of the same diameter as the apertures or openings 45 and 48 with which it is aligned in the assembled structure.

The plate 55 is positioned in the assembly to have the open side of the race or channel 56 directed toward the adjacent plate 51 and, as shown, the diameter of this channel is only slightly greater than the diameter of the depression in the plate 41 and the race is completely filled with the bearing balls 58 which rest on the adjacent outer face of the plate 41.

The plates 41 and 42 and the bearing unit plate 55 are secured in operative relation by a rivet stud which is generally designated 59, which corresponds to the stud 28 of the first described embodiment.

This stud, like the stud 28, comprises a head portion 60 and a body portion 61 which is reduced adjacent to the free end to produce the end portion 61a of smaller diameter and the shoulder 62 at the inner end of this reduced portion.

When the plates 41 and 42, together with the bearing unit 54, are assembled in the relation illustrated in Fig. 11, the body of the stud is extended through the aligned openings 45, 48 and 57 and in this construction, the length of the shouldered portion of the body is predetermined to a very accurate degree so that when the parts are so assembled and the stud is introduced, the shoulder 62 will lie slightly below the outer surface of the plate 55. A collar or washer 63 is then placed about the reduced portion 61a to rest upon the plate 55 and the extended end of the portion 61 is then mashed or swaged over as indicated at 64 and sufficient pressure is imposed thereby against the collar 63 to bring the collar down to the shoulder 62 thereby forcing the parts together under a certain amount of pressure or tension which will create sufficient friction to prevent free spinning action between the plates.

In both embodiments of the invention, the diameters of the openings of the plates and the diameters of the rivet studs extending therethrough are calculated to remove all tolerance so that the assembly will fit snugly and turn without play. This second embodiment of the swivel is designed primarily for mounting a chair seat upon a supporting base and by this novel construction, whereby the tight fitting assembly is obtained, a chair seat supported by the swivel will not spin or rotate freely when the seat is unoccupied. However, upon the application of weight as by a person occupying the seat supported by the swivel, free turning of the seat is permitted by the swivel but, as soon as the occupant leaves the seat, it will remain in position instead of swinging as is common with other types of pivoted or swivelly supported chair seats.

Another novel action obtained in the use of this embodiment of the invention in supporting a chair seat is that the stability of the chair seat is improved in that looseness or wobbling of the same with respect to the base is entirely eliminated.

Figs. 13 and 14 illustrate the application of the swivel structure to a chair of the office type. In this type chair there is illustrated the chair seat which is generally designated 65, supported by feet or legs 66 which are coupled together beneath the center of the chair by the conventional supporting body or block 67. In this particular form of chair, there has been illustrated the conventional supporting screw 68 which, by means of a threaded collar 69, allows for the vertical adjustment of the seat and to illustrate one way in which the swivel may be installed in the supporting screw 68 and the seat bottom 65, the supporting screw has been shown as having upon the top thereof a plate 70 to which the bottom or underplate 42 of the swivel unit is shown secured by screws 71.

The top plate 41 is secured to the underside of the chair seat which may be provided with suitable cross members 72 to facilitate the attachment of the top plate and provide clearance for the bearing unit 54 or the underside of the seat 65, if of solid construction, may be provided with the suitable central recess to provide the necessary clearance for the bearing unit 54.

While the swivel has been illustrated as applied upon the upper end of the threaded post or screw 68, it is to be understood that it might be installed by securing the bottom plate 42 directly upon the top of the block 67 and, obviously, many other types or designs of bases for a chair seat may have the swivel placed thereon.

In the preceding description of the invention in the two embodiments thereof, reference has been made to the use of a shouldered stud in association with a binding collar which is forced into tight frictional engagement with an element of the swivel upon the swaging over of the reduced end portion of the stud whereby the desired tight engagement between the swivel parts is effected. Reference has also been made to the use of a sleeve on a straight stud whereby to obtain a shoulder against which the binding collar or washer is forced by the swaging action. Figs. 16 to 18 illustrate another means by which the desired binding or securing together of the elements of the swivel may be accomplished. In these figures, the use of a straight unshouldered pivot stud is disclosed.

Figs. 16 and 17 illustrate the use of the straight unshouldered stud for securing together plate members of the first described embodiment of the invention as illustrated in Figs. 1 to 4 and in these figures, the reference characters 12b and 14b designate the top and bottom plates of the swivel and the reference character 23a generally designates the bearing unit interposed therebetween and corresponding to the unit 23 hereinbefore described. The numerals 19a and 20a designate the apertures in the plates 12b and 14b through which is extended the straight shank portion 30a of the securing stud 28a. The free end of the stud which projects beyond the top plate 12b has placed therearound the binding collar 32a and use is made of a riveting machine or press to swage the free end of the stud with the desired degree of pressure to turn down a securing flange 33a against the collar 32a to impose a predetermined amount of pressure against the collar and effect the tight binding together of the plates and the bearing unit whereby to produce the swivel having the desired hereinbefore described characteristics.

Fig. 18 illustrates a portion of the central part of the second described embodiment of the swivel structure showing the use of the straight unshouldered pivot stud for securing the swivel parts together in the manner described in connection with the embodiment illustrated in Figs. 16 and 17. In this Fig. 18, the reference characters 41b and 42b designate respectively the top and bottom plates of the swivel unit and the numeral 54a generally designates the bearing unit engaging the top plate 41b and corresponding to the unit 54 hereinbefore described.

The straight or unshouldered stud which is generally designated 59a comprises the straight unshouldered shank portion 61a which extends thorugh the central apertures 45a and 48a of the plates and through the aligned central aperture 57a of the bearing unit to receive upon the end remote from the head 60a the binding collar 63a. The end of the stud is swaged over as illustrated at 64a to press the collar 63a against the adjacent portion of the bearing unit and as in the case of the construction illustrated and described in Figs. 16 and 17, the amount of swaging and pressure is controlled so as to draw the plates of the swivel and the bearing unit together to the desired degree whereby the parts will be held against free spinning rotational movement but will turn freely upon the application of pressure or when a weight is placed upon the swivel.

From the foregoing, it will be seen that there is provided by the present invention a new and novel type of swivel construction wherein the relatively movable parts are associated in a manner which prevents play which would result in a rattling or looseness and wherein free swinging or turning movement between the parts joined by the swivel is prevented in the unloaded swivel but rotation or turning movement may take place easily when weight is applied thereto or the swivel is loaded as by the placing of a body in a chair or upon a chair seat supported by the swivel structure.

While in the description of the rivet studs, the same have been described as comprising a body portion having an end turned down to a reduced diameter to provide a shoulder, it is also contemplated to use a sleeve on the rivet body, of less length than the body, whereby to provide the portion of larger diameter and to also provide, at the end of the sleeve remote from the rivet head, the desired shoulder against which the collar or washer is forced by the swaging over of the end of the rivet.

In the swivel structure in both embodiments illustrated, in the initial assembly of the parts, the swaging of the pivot stud gives a unitary structure and the amount of force imposed by such swaging of the pivot stud results in holding the parts so that rotation of one plate relative to the other may be accomplished only by some slight effort. However, when a weight is imposed upon the swivel, as when in the one form a television unit is mounted thereon, or, as in the other form when used to support a chair seat, the weight of a person is applied, the thrust forces imposed upon the bearings will be such that the supported body may then be turned with relative ease and without looseness. In other words the initial relatively tight securing of the parts together by the action of binding the washer down with a certain degree of force, controlled in one case by accurately controlling the length of the collar or in the other case by the amount of swaging of the end of the stud, will prevent any looseness which would permit the chair, television unit or other body supported by the swivel, to wobble while at the same time allowing the same to be turned or rotated with little effort.

I claim:

1. A swivel comprising two plates each having a central opening therethrough and juxtaposed with said openings aligned, an annular bearing cup having an annular raceway concentric with the aligned openings, said cup being positioned with the raceway directed toward a face of one plate, bearing balls in said raceway and in rolling engagement with said face of said one plate, said raceway being of a depth only slightly less than the diameter of the bearing balls whereby the outer edge of the raceway lies in close proximity to said face whereby said face covers the cup and forms therewith a substantially closed ball housing, a pivot member extending through said openings, the openings both being of a diameter to snugly encircle the pivot member, and means carried by the pivot member and having said plates therebetween and securing the plates in a predetermined axially spaced relation.

2. A horizontal swivel comprising a first plate, a second and a third plate, said first and second plates being of substantial area and having confronting annular channels forming a bearing ball race, bearing balls in said race and maintaining the first and second plates in spaced relation, said third plate embodying an inner circular disk portion of relatively large diameter and a surrounding circular upwardly and outwardly curving bearing ball race cup forming outer part spaced a considerable distance inwardly from the first mentioned race and spaced a considerable distance outwardly from the vertical axis of rotation of the swivel, said outwardly curving bearing ball race cup forming outer part having an end edge portion overlying and being closely adjacent to the outer surface of the second plate, bearing balls in said ball race forming outer part and engaging said outer surface of the second plate, and means rigidly coupling said first and third plates together to form a unit whereby the second plate is rotatable relative to the coupled plates.

3. In an article of furniture such as a chair having a base part and a superposed part overlying the base part; a horizontal swivel for coupling said parts whereby the superposed part is rotatable relative to the base part, said swivel comprising a first plate having means facilitating its attachment to said base part, a second plate overlying the first plate and having means facilitating its attachment to said rotatable part, a third plate in overlying relation with the second plate, said first and second plates being of substantial area, and having confronting annular channels forming a bearing ball race, bearing balls in said race and maintaining the first and second plates in spaced relation, said third plate embodying an inner circular disk portion of relatively large diameter and a surrounding circular upwardly and outwardly curving bearing ball race cup forming outer part spaced a considerable distance inwardly from the first mentioned race and spaced a considerable distance outwardly from the vertical axis of rotation of the swivel, said outwardly curving bearing ball race cup forming outer part having an end edge portion overlying and being closely adjacent to the outer surface of the second plate, bearing balls in said ball race forming outer part and engaging said outer surface of the second plate, and means rigidly coupling said first and third plates together to form a unit whereby the second plate is rotatable relative to the coupled plates.

4. A swivel comprising a first plate and a second plate each having a central inwardly depressed portion providing a central area in offset parallel relation with the surrounding body portion of the plate and joined thereto by a surrounding angularly disposed portion, said central areas each having a central opening therethrough, the plates being juxtaposed with the inwardly depressed portions extending toward and facing each other and with the openings therein aligned, an annular bearing raceway channel formed in each plate concentric with and remote from the depressed portion thereof, said channels being in opposed coacting relation and together forming a ball bearing raceway, bearing balls in said raceway and maintaining the plates in spaced relation, a separate and independent bearing unit embodying a third plate having an inner circular disk portion centrally aperture and overlying the central depressed portion of the second plate and disposed upon the outer side of the second plate and having a surrounding circular upwardly and outwardly curving bearing ball race cup forming outer part spaced a considerable distance inwardly from the said raceway and spaced a considerable distance outwardly from the vertical axis of rotation of the swivel, said outwardly curving bearing ball race cup forming outer part having an end portion overlying and being closely adjacent to the outer surface of the second plate adjacent to and around the outer side of the adjacent inwardly depressed portion thereof, bearing balls in said ball race forming outer part and in constant firm engagement with the outer surface of the second plate between said end portion and said adjacent inwardly depressed portion, a pivot stud extending through said aligned openings and through the central aperture of the third plate and having a head on one end in the depressed portion of the first plate, and means carried by the other end of the stud and in cooperation with the head of the stud coupling together the first and third plates to form a unit and for maintaining both ball races in firm engagement with the ball bearings therein and whereby the second plate is rotatable relative to the coupled plates.

5. In an article of furniture such as a chair having a base part and a superposed part overlying the base part; a horizontal swivel for coupling said parts whereby the superposed part is rotatable relative to the base part, said swivel comprising a first plate having means facilitating its attachment to said base part, a second plate overlying the first plate and having means facilitating its attachment to said rotatable part, a third plate in overlying relation with the second plate, the first plate and the second plate each having a central inwardly depressed portion providing a central area in offset parallel relation with the surrounding body portion of the plate and joined thereto by a surrounding angularly disposed portion, said central areas each having a central opening therethrough, the plates being juxtaposed with the inwardly depressed portions extending toward and facing each other and with the openings therein aligned, an annular bearing raceway channel formed in each of the first and second plates and concentric with and remote from the depressed portions thereof, said channels being in opposed coacting relation and together forming a ball bearing raceway, bearing balls in said raceway and maintaining the first and second plates in spaced relation, the said bearing unit embodying the third plate having an inner circular disk portion centrally apertured and overlying the central depressed portion of the second plate and disposed upon the outer side of the second plate and having a surrounding circular upwardly and outwardly curving bearing ball race cup forming outer part spaced a considerable distance inwardly from the said raceway and spaced a considerable distance outwardly from the vertical axis of rotation of the swivel, said outwardly curving bearing ball race cup forming outer part having an end portion overlying and being closely adjacent to the outer surface of the second plate adjacent to and around the outer side of the adjacent inwardly depressed portion thereof, bearing balls in said ball race forming outer part and in constant firm engagement with the outer surface of the second plate, a pivot stud extending through said aligned openings and through the central aperture of the third plate and having a head on one end in the depressed portion of the first plate, and means carried by the other end of the stud in engagement with said disk portion of the third plate, cooperating with the head of the stud and coupling together the first and third plates to form a unit and for maintaining both ball races in firm engagement with the ball bearings therein and whereby the second plate is rotatable relative to the coupled plates.

References Cited in the file of this patent

UNITED STATES PATENTS

| | | |
|---|---|---|
| 1,249,707 | Zimmerman | Dec. 11, 1917 |
| 1,337,059 | Fisher | Apr. 13, 1920 |
| 1,524,424 | Darlington | Jan. 27, 1925 |
| 1,722,493 | Brunner | July 30, 1929 |
| 1,752,030 | Roe | Mar. 25, 1930 |
| 1,815,062 | Herold | July 21, 1931 |
| 1,873,888 | Herold | Aug. 23, 1932 |
| 2,234,344 | Hedges | Mar. 11, 1941 |
| 2,592,811 | Lebensfeld | Apr. 15, 1952 |
| 2,607,641 | Messinger | Aug. 19, 1952 |
| 2,625,983 | Slyter et al. | Jan. 20, 1953 |
| 2,641,310 | Simjian | June 9, 1953 |
| 2,671,631 | Fox | Mar. 9, 1954 |

FOREIGN PATENTS

| | | |
|---|---|---|
| 695,600 | Great Britain | Aug. 12, 1953 |
| 812,705 | Germany | Sept. 3, 1951 |